Oct. 31, 1961 W. M. BLAKE 3,006,468
AUTOMATIC LUMBER SORTER AND STACKER
Filed Dec. 8, 1958 4 Sheets-Sheet 1
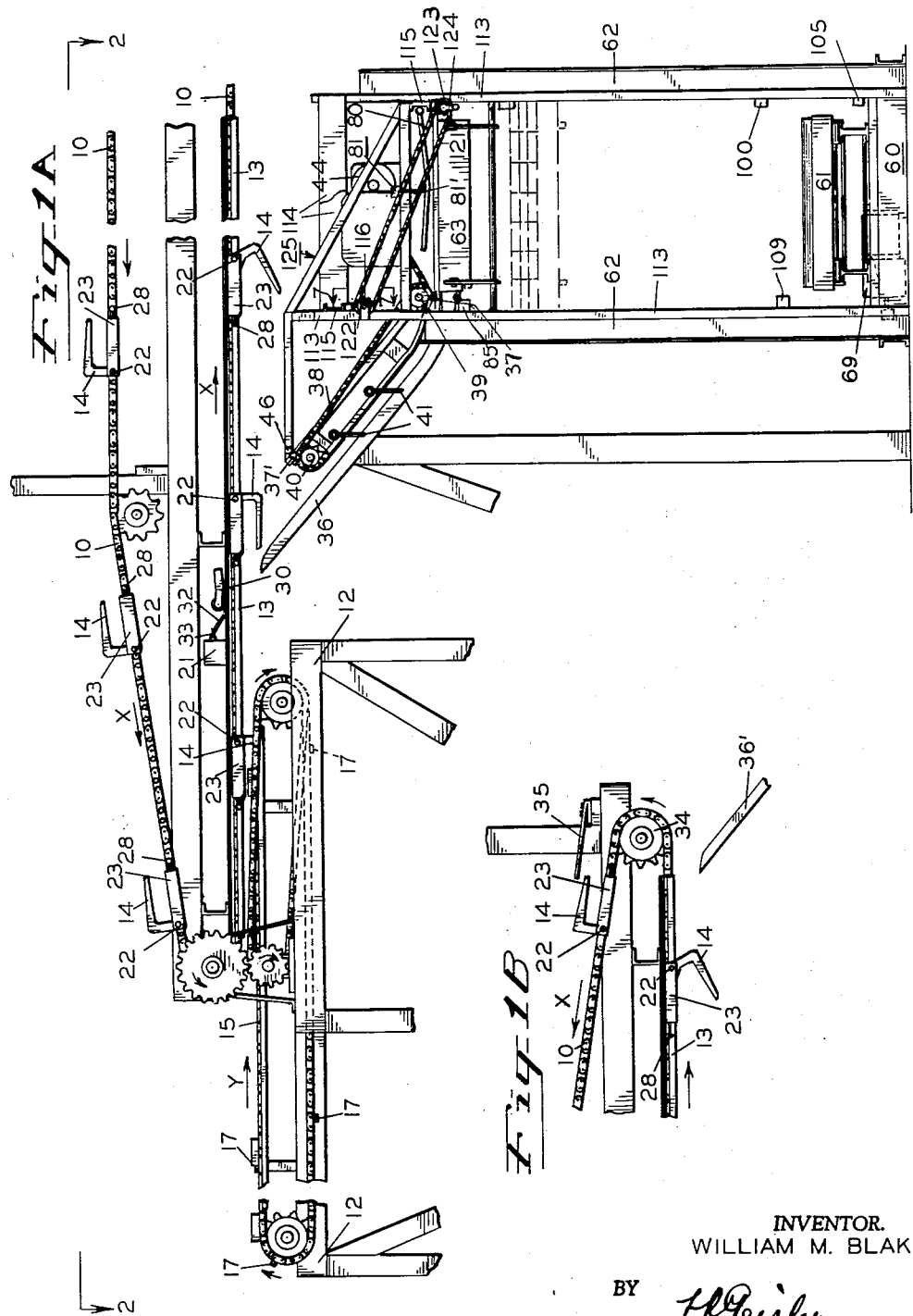
INVENTOR.
WILLIAM M. BLAKE
BY
ATTORNEY

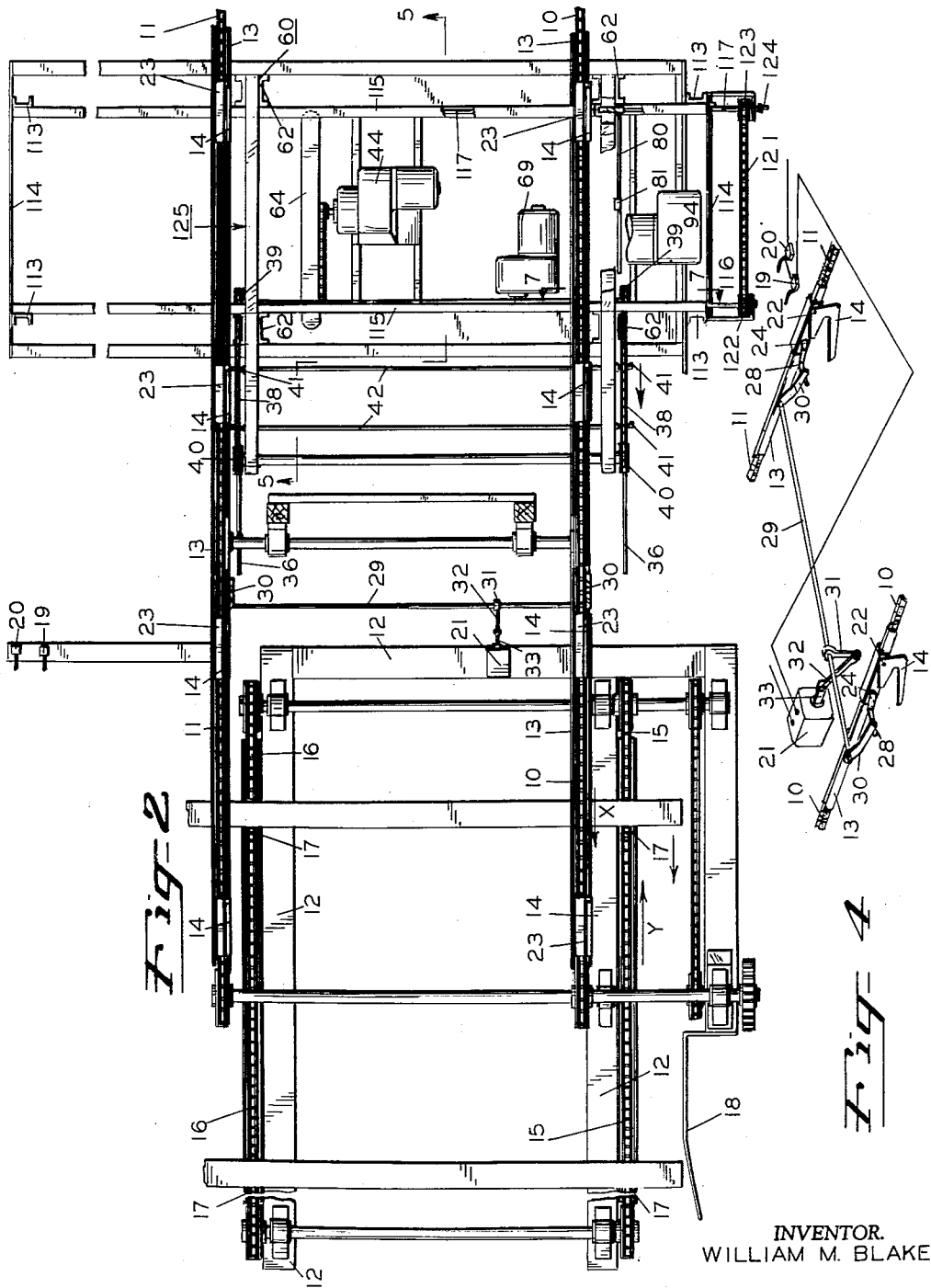

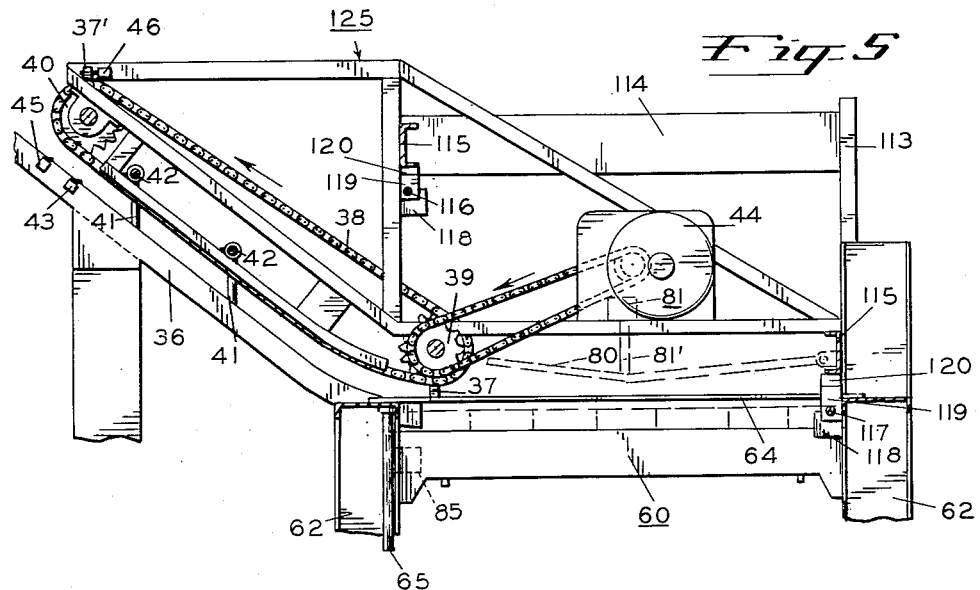
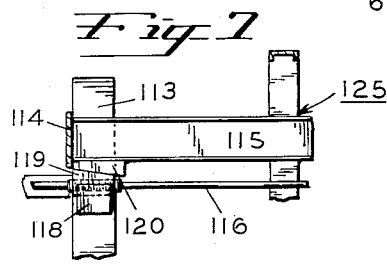
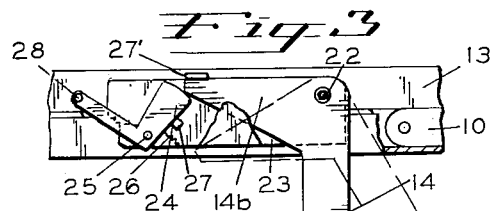
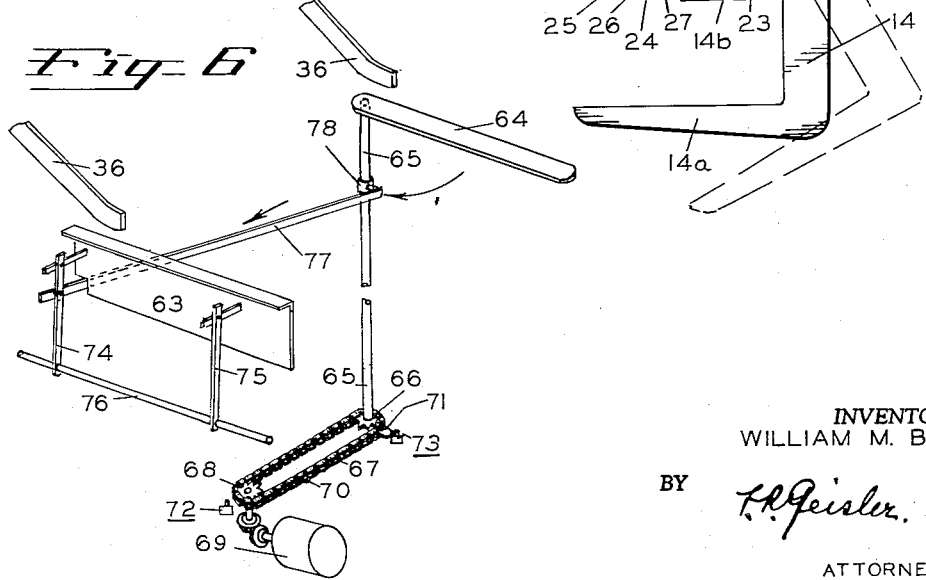

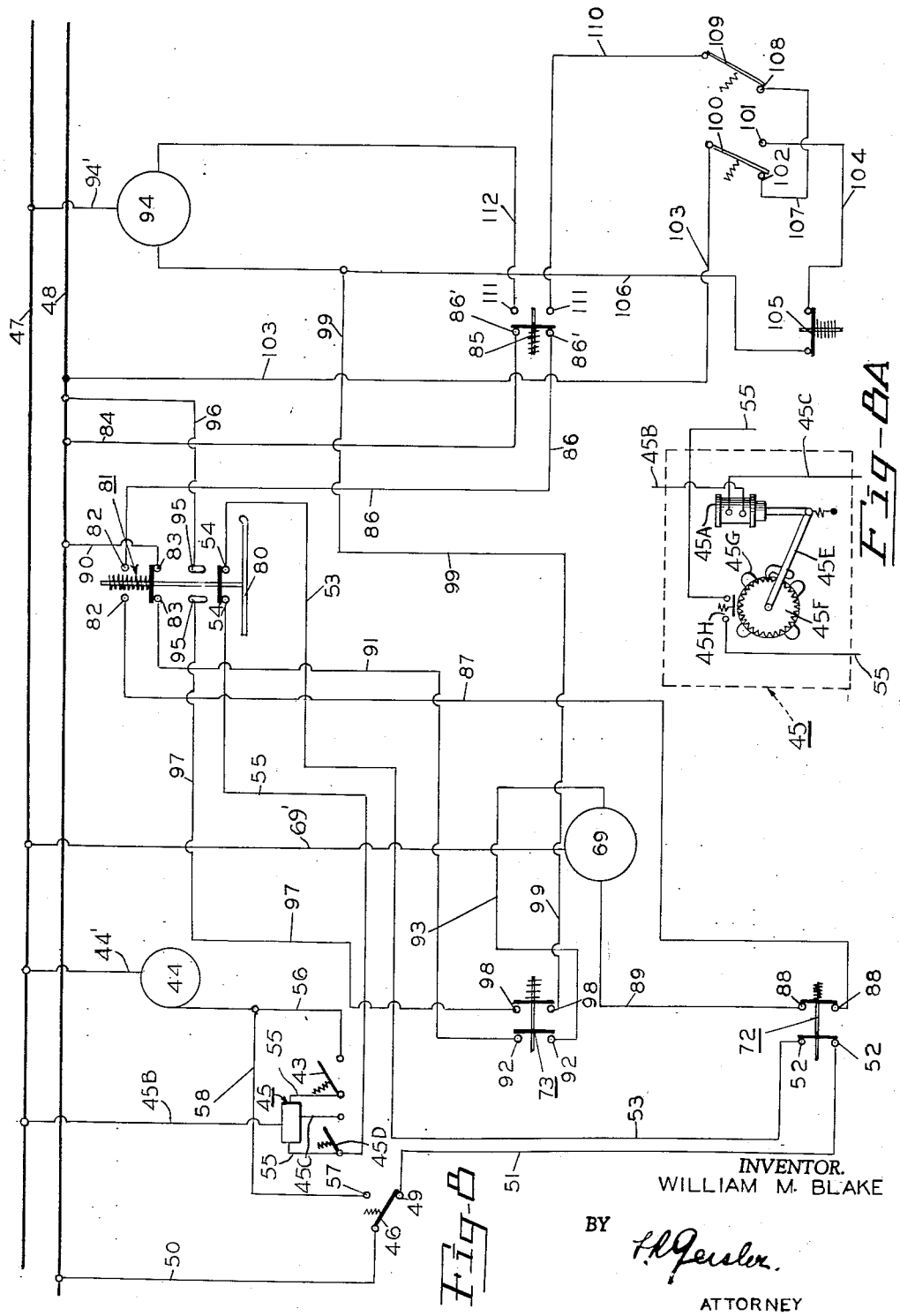

United States Patent Office 3,006,468
Patented Oct. 31, 1961

3,006,468
AUTOMATIC LUMBER SORTER AND STACKER
William M. Blake, Coos Bay, Oreg., assignor to Moore Oregon Lumber Co., a corporation of Nevada
Filed Dec. 8, 1958, Ser. No. 778,976
7 Claims. (Cl. 209—90)

This invention relates in general to the handling of lumber in a lumber mill, and, more specifically, to the sorting and stacking of individual boards or pieces of lumber as they are delivered from the planer. Since, in most instances, the boards or pieces of lumber delivered from the planer will be of random length, it is necessary that these be sorted according to length and arranged in separate stacks or truckloads for subsequent shipment or storage.

The object of this invention is to provide a practical device through the medium of which boards of various lengths will be arranged in groups, with the boards in each group being substantially of the same predetermined length.

A related object of the invention is to provide an improved lumber sorter in which the boards will not only be sorted according to length but will also, at the same time, be arranged in stacks of desired stack size on trucks for transfer from the device and for subsequent shipment or storage.

Another object of the invention is to provide an improved and simplified lumber sorter and stacker assembly with which the sorting and stacking of the boards or lumber will take place automatically and rapidly.

A further object of the invention is to provide an automatic sorter and stacker for boards of various lengths having the same thickness, with simple means for adjusting the device whenever a supply of boards of different thickness is to be sorted and stacked.

An additional object is to provide a lumber sorter and stacker of the nature above indicated which will be of simple and practical construction and which will not require any excessive amount of care in its operation and maintenance.

The manner in which these objects and other advantages are attained and the construction and manner of operation of the lumber sorter and stacker will be briefly explained with reference to the accompanying drawings, in which:

FIGS. 1A and 1B together form a foreshortened side elevation of the entire device, with certain minor details omitted for the sake of clarity;

FIG. 2 is a partial plan view taken on line 2—2 of FIG. 1A;

FIG. 3 is an enlarged elevation of one of the lumber-carrying hooks mounted on each of the main chain conveyors of the device, the broken lines indicating the position of the hook when it is allowed to drop into lumber releasing position, most of the outer cover plate for the hook mounting being broken away for clarity;

FIG. 4 is a schematic perspective drawing showing a pair of lumber-carrying hooks and illustrating the manner in which they are automatically operated for discharging a piece of lumber which they have been carrying;

FIG. 5 is a sectional elevation taken on line 5—5 of FIG. 2 but drawn to a larger scale;

FIG. 6 is a schematic perspective view of the stacking control means;

FIG. 7 is a fragmentary sectional elevation taken on line 7—7 of FIGS. 1A and 2, illustrating in part the means for adjusting the stacking means to accommodate boards of different thickness;

FIG. 8 is a wiring diagram, with certain details such as ordinary relays omitted for simplicity; and FIG. 8A is a diagrammatic detail of a counter-operated switch assembly indicated at 45 in FIG. 8.

Referring first to FIGS. 1A, 1B and 2, the device includes a pair of endless main chain conveyors 10 and 11 which are driven in unison at constant speed by suitable means (not shown) in a direction indicated by the arrows X in FIGS. 1A and 1B. These chain conveyors are mounted on suitable driven sprockets at one end and idler sprockets at the other end, which sprockets are supported on top of a framework, indicated in part at 12 in FIG. 1A. This supporting framework extends the entire length of the device and the height of the framework considerably exceeds the height of the stacks into which the sorted lumber is to be arranged. The upper courses of the main chain conveyors pass over other supporting sprockets while the lower courses of these conveyors pass along horizontal supporting tracks 13, which may be in the form of angle iron or channel iron bars.

The main chain conveyors 10 and 11 carry board-supporting hooks 14, described more fully later, which are spaced equal distances apart on both chain conveyors, with the hooks on the two chain conveyors being in transverse registration respectively so that each registering pair of hooks will be capable of carrying a board. The hooks 14 face in the direction opposite the direction of travel of the chain conveyors, as shown in FIG. 1A, and the hooks are hinged to their mounting supports on the main chain conveyors and are held in normal-carrying position by latch means so arranged that the release of the latches for a pair of hooks will enable the pair of hooks to drop down sufficiently to cause the board which is being carried on them to slide off and be discharged onto a stack.

A pair of feeder chains 15 and 16 (FIGS. 1A and 2) are positioned at the intake end of the assembly, and thus at the left as viewed in these figures. These feeder chains are located a slight distance below the level of the main chain conveyors 10 and 11 and are positioned to one side of the main chain conveyors respectively. The feeder chains extend a short distance adjacent the path of the lower course of the main chain conveyors, being arranged at approximately the same level as the lower portions of the hooks 14. These feeder chains carry cleats or lugs 17, spaced equal distances apart, but the spacing between these cleats is greater than the spacing between the hooks 14 of the main chain conveyors. The feeder chains are driven in unison through suitable connecting means from the main chain conveyors, or from the driving means for the latter (not shown), but are driven in opposite direction from the main chain conveyors, as indicated by the arrows Y in FIG. 1A, and furthermore are driven at a speed which is faster than the main chain conveyors 10 and 11. However the speed of the feeder chains is so synchronized with the speed of the main chain conveyors that each pair of cleats 17 on the feeder chains will catch up with a pair of hooks 14 on the main chain conveyors by the time the top courses of the feeder chains reach the end of their travel to the right (as viewed in FIG. 1A).

The boards to be sorted and stacked are delivered one at a time onto the feeder chains 15 and 16 by any suitable means. For example, they may be delivered by an endless conveyor discharging onto the feeder chains, or they may be delivered to an operator's platform adjacent the feeder chains and placed manually on the feeder chains. In either case one end of the boards will be brought against an upright baffle plate 18 (FIG. 2), which is adjustably mounted on the frame 12 by suitable means (not shown), and which will cause all the boards to be substantially even at one end when being carried by the device, the other end being left uneven due to the varying lengths of the boards. As each board on the feeder chains is engaged by the pair of cleats and moved towards the right (as viewed in FIG. 1A), it will catch up with a pair of hooks 14 on the main chain conveyors until the board is deposited on such pair of hooks, whereupon it leaves the end of the course of the feeder chains and moves along with the main chain conveyors.

The main chain conveyors 10 and 11 pass over a number of board delivery and stacking stations, according to the number of different lengths into which the boards are to be sorted and stacked. For the sake of simplicity only one such delivery and stacking station is shown in the drawings and only one need be described since the arrangement and manner of operation of the device at each station will be identical. Each successive delivery and stacking station receives boards of predetermined and less length than the preceding station. Thus the first station receives the longest boards desired for stacking. Finally any boards which are too short (or too long) for delivery at any station are discharged as rejects at the end of the course of the chain conveyors for such further use as may be desired.

A pair of switches 19 and 20 (FIG. 2) are located in advance of each delivery and stacking station. These switches are positioned at that side of the device at which the uneven ends of the boards extend. Each switch has a downwardly-extending, spring-controlled actuating element (not shown) adapted to operate the switch momentarily by being contacted by a moving board. The switches of each pair are arranged close together, one switch being placed further out on the side of the device than the other. For example, the switches would be placed two inches apart if not more than two inches variation in the lengths of the boards delivered to any one station is desired. The outer switch 20 is normally closed and so arranged that it will be momentarily opened by being contacted by the end of a board. The inner switch 19 is normally opened and is so arranged that it will be momentarily closed by being contacted by such board end. Both switches are located in the circuit to a solenoid 21 (FIGS. 2 and 4). The arrangement is such that the solenoid 21 will be energized only if the end of a board operates switch 19 alone. If the end of the board should operate both switches (thus when the board is longer than desired) or if the board fails to operate switch 19 at all (thus when the board is too short for delivery at that particular station) the solenoid 21 will not be actuated. The pair of switches 19 and 20 are placed closer in for each successive station along the device inasmuch as each subsequent station is intended to receive shorter boards than the preceding station. The energizing of solenoid 21 causes the pair of hooks 14, carrying the board which has contacted the switch 19, to be released in the manner now to be explained, and consequently causes a pair of hooks 14 to discharge the board at the corresponding station.

Each of the board-carrying hooks 14 (FIG. 3) is mounted on a pivot pin 22 secured on a mounting plate 23, which mounting plate in turn is secured on the outer side of a main chain conveyor 10 or 11. In the board-carrying position of the hook 14, as shown in full lines in FIG. 3, the main or bottom arm 14a of the hook is held substantially horizontal and thus in position for supporting a piece of lumber. The upper portion of the hook 14 has a projection 14b, shaped preferably as shown in FIG. 3, extending in the same direction and located in the same vertical plane as the rest of the hook, and this portion of the hook is so arranged as to be engaged by an L-shaped latch 24, which latch is pivotally mounted on the plate 23 at 25. A spring 26 normally holds this latch in the position indicated in full lines in FIG. 3 with the latch engaging a stop 27. When the hook 14 and latch 24 are in the full line position of FIG. 3 the top edge of the hook is held against a rest 27' by the engaging latch 24. However, if the latch is rotated slightly counter-clockwise against the force of its spring 26 until the curved engaging upper edge of the latch is moved out of engagement with the end of the portion 14b of the hook, then the hook will drop into the lower broken line position of FIG. 3 until returned to the normal full line position.

The latch 24 for the hook 14 carries an engageable pin 28. A transversely-extending shaft 29 (FIGS. 2 and 4) is rotatably mounted in supports (not shown) on the main frame of the device above the lower course of the main chain conveyors 10 and 11. A pair of identical parallel contact bars 30 are secured to the ends of the shaft 29 respectively and are so arranged that when they are swung downwardly they will be in position to engage the pins 28 (FIG. 3) of the latches for the board-carrying hooks 14 on the main chain conveyors 10 and 11 respectively. An arm 31, secured on the shaft 29, is connected by a link 32 to a spring-controlled plunger 33 of the solenoid 21. Energizing of the solenoid 21 causes the plunger to be moved inwardly against the force of its spring (not shown), thus causing partial rotation of the shaft 29 which in turn moves the contact bars 30 downwardly so as to engage the pins 28 of the latches for the pair of hooks 14 moving beneath the contact bars 30. This results in the pair of hooks 14 swinging downwardly at that particular station and discharging the piece of lumber which they had been carrying.

When the hooks 14 reach the end of the lower course of the main conveyor chains 10 and 11 (FIG. 1B) and pass over the end sprockets 34 for the main conveyor chains, the turning of the hooks upside down ordinarily would cause those hooks which had been released to return to latched position. However, in the event the hooks should stick on their pivot pins and their weight be insufficient to cause them to return to latched position, a pair of guide plates 35 are so positioned as to cause the hooks to be pushed back into latched position as they pass over these end sprockets. If any pieces of lumber are either too short or too long to be desired for any of the discharge stations along the device, and thus where the hooks carrying such pieces have not been made to discharge the same by actuation of any of the switches along the line of travel, such pieces of lumber will be finally discharged from the hooks when the hooks pass over the end sprockets 34, causing such pieces of lumber to slide off from their pair of hooks onto skids 36' (FIG. 1B) and slide down onto a pile of miscellaneous undersize or oversize pieces.

At each delivery and stacking station a pair of skids 36 (FIGS. 1A, 2 and 5) lead from below the lumber-carrying hooks 14 downwardly and forwardly to the stacking assembly, being so positioned that each board discharged by a pair of hooks 14 at that station will drop onto the skids. Each stacking assembly includes a hoist or lift, indicated in general by the reference character 60 in FIG. 1A, and operating mainly under automatic switch controls described later. The lift mechanism itself is of well-known construction and includes vertical guide tracks 62 and the usual hoisting chains and pulleys which are not shown and which need not be described since lifts of this general type are common in lumber mills. Preferably, but not necessarily, the lumber-supporting platform on the lift is in the form of a hollow rectangle so that this lift platform can move up and down over a stationary platform, which supports rails onto which a lumber transfer truck 61 can be moved, and can move up and down past the truck. This preferred arrangement is such that, when the desired stack has been loaded on the lift platform, the final lowering of the lift to its lowest position, below the level of the transfer truck and the rails, will leave the stack deposited on the truck and thus enable the truck with the stack load then to be moved off and away from the lift assembly and replaced by another empty truck for the subsequent loading of the latter similarly. The lift is raised to its highest position preparatory to the loading of lumber onto the lift and the lift is then intermittently lowered as each layer of lumber for the stack is moved into place, until the desired stack of predetermined size has been completed on the lift.

The individual boards, as discharged onto the skids 36, are held on the skids until enough boards have accumulated thereon to form an entire layer for the stack on the lift. Then the group of boards is moved over onto a pair of movable rest supports 63 and 64 (FIGS. 1A, 2 and 6) and subsequently set down on the stack, as later described.

When the first board for a layer is discharged onto the skids 36 it is halted at the bottom of the skids by contact with a pair of lugs 37 (one of which is shown most clearly in FIG. 5), which lugs are mounted on a pair of endless chains 38 (FIGS. 1A, 2 and 5). This pair of lugs 37 hold the board at the bottom of skids 36 until sufficient boards have accumulated on the skids to produce a complete layer for the stack. As the boards are deposited on the skids 36 they engage pairs of arms 41 (FIGS. 1A and 5), each pair of arms being secured to the ends of a freely rotatable shaft 42, the arms of each pair being parallel. The purpose of these swinging arms 41 is to keep each board in substantially horizontal position as it slides down the skids 36 and thus prevent any possibility of having a board slide down with one end so much lower than the other as would cause one end to drop off of a skid or to interfere with the desired even arrangement of the boards in each layer for the stack.

A second pair of lugs 37' (FIGS. 1A and 5) are mounted on the pair of endless chains 38 respectively at a half chain length from the first mentioned lugs 37. The chains 38 are mounted on lower and upper pairs of sprockets 39 and 40, the lower sprockets 39 being secured on a shaft which is driven by sprocket and chain connection from a motor 44. A counter-operated switch assembly 45 (FIGS. 5 and 8A) and a cooperating contact switch 43, which, under certain conditions, can close the circuit to the motor 44, are mounted on one of the skids 36 and have spring-controlled actuating elements adapted to be contacted by the boards passing down the skids. The counter-operated switch assembly 45 is so set as to close a contact in the circuit to the motor 44 when a predetermined number of boards (sufficient to form a complete layer for the stack) have passed the counter. The purpose of the switch assembly 45 and cooperating contact switch 43 in the circuit to the motor 44 is to start the operation of the motor when sufficient boards have accumulated on the skids 36 to form the layer for the stack. The operation of the motor 44 causes the chains 38 to be driven in unison in the direction indicated by the arrow in FIG. 5, and causes the lugs 37' to push the boards from the skids on to the pair of movable rest supports 63 and 64.

A two-way switch 46 (FIGS. 5 and 8) is also located in a circuit to the motor 44 and has a spring-loaded actuating element (not shown) which normally connects the switch with one contact, but, when this spring-loaded element is engaged by either lug 37 or 37', the resulting movement of the element against the force of its spring opens the first contact and closes the second. The arrangement is such that when the motor 44 starts to operate it will continue operating only until the chains have moved through one-half of their complete course, and the motor will cease to operate when the spring-loaded element in switch 46 is contacted by the next lug 37 (or 37') and will not start operating again until enough boards have accumulated on the skids 36 for another layer.

Referring momentarily to the wiring diagram of FIG. 8, in which 47 and 48 indicate the main conductor lines from a suitable source of power, the operation of the controls for the motor 44 are illustrated in the portion of the diagram on the left. When the spring-loaded actuating element of switch 46 is contacted by lug 37 (or lug 37') and held against the force of its spring the switch 46 will close the contact 49. Then, when the required number of boards for the layer on the stack have passed the counter operated switch assembly 45, and the last board holds down the spring-controlled actuating element for the switch 43, current to the motor 44 will pass from the main conductor 48, through branch line 50, switch 46, contact 49, line 51, normally closed contacts of limit switch 72 (to be described later), line 53, normally closed contacts 54 of multiple switch assembly 81 (to be described later) line 55, counter-operated switch assembly 45, closed switch 43, and line 56 to motor 44 which is connected to main conductor 47 by line 44'. Normally this will cause the motor 44 to operate and the layer feed chains 38 to move. Such movement of the feed chains 38 causes the lug 37' (or lug 37), which had engaged the spring-loaded element in switch 46, to release the element, allowing the element, under the force of its spring, to cause the switch 46 to close the contact 57. Thereupon current passes through by-pass line 58 to the motor 44, enabling the motor to continue to operate until the lug 37 (or 37') engages the spring-loaded element in the switch 46. Then this stops operation of the motor 44 since the circuit through counter-operated switch assembly 45 and switch 43 is open and all movements of the layer feed chains 38 cease until sufficient boards have collected on the skids 36 to form the next layer for the stack. Referring to FIG. 8A and also to FIG. 8, the counter-operated switch assembly 45 includes a solenoid 45A which is connected to main conductor 47 by the line 45B and which is connected to line 55 by line 45C and a spring-loaded contact switch element 45D. The engaging of the element 45D by a board passing down the skids 36, momentarily connecting the solenoid 45A with the line 55, actuates the solenoid. Each actuation of the solenoid causes upward swing of a pivoted arm 45E which carries a pawl engaging a ratchet wheel 45F. The ratchet wheel 45F is attached to a rotatable disc having equally-spaced peripheral cam lobes 45G, each of which, when moved into engagement with a spring loaded contact switch 45H in the line 55, closes the switch until the solenoid is again actuated. The cam lobes and ratchet wheel teeth are so spaced that a desired number of actuations of the solenoid 45A (and thus the passing contact of a desired number of boards sliding down the skids 36) will be required before a cam lobe closes the contact switch 45H. When the passing of the desired number of boards down the skids 36 causes the switch 45H to be closed, the last board to pass down will be resting momentarily on the cooperating contact switch 43, completing the circuit through the lines 55 and 56 to the motor 44 and holding the circuit closed until the operation of the motor 44 causes the layer of boards to move down off the skids 36. However, operation of the motor 44, moving the chains 38, releases the spring loaded element of switch 46 which closes the contact 57 and causes current to pass to the motor 44 through the by-pass line 58, as previously mentioned.

The operation and function of the movable rest supports 63 and 64 will now be described with reference to FIG. 6. The movable support 64 is secured at the top of a vertical shaft 65 which extends up at the side of the lift frame and is rotatably mounted in suitable bearings (not shown). An endless sprocket chain 67 passes around a sprocket 66 secured at the bottom of the shaft 65 and around a driven sprocket 68 which is driven by a bevel gear connection with the shaft of a reversible motor 69. Switch-engaging elements 70 and 71 are adapted to engage the limit switches 72 and 73 respectively to limit the operation of the motor 69 in either direction and thereby limit the rotation of shaft 65 and the swing of the movable support 64 to a swing through an arc of 90°. In its normal position the support 64 extends across over the top of the stack (as shown also in FIG. 2), and the arrangement is such that when the motor 69 starts operating the support 64 is caused to swing (clockwise as viewed in FIG. 6) through an arc of 90° until the element 70 engages limit switch 72 and stops the operation of the motor 69 in that direction. Then immediately (as the motor is reversed), the support 64 swings back to its normal position and the engagement of element 71 with limit switch 73 stops the reverse movement of the motor 69.

The movable support 63 is an L-shaped member, as shown in FIG. 6, and is mounted on a pair of arms 74 and 75 which extend up from a shaft 76, the shaft 76 being rotatably supported at one end of the lift frame. A bar 77 has one end pivotally connected to the arm 74 and the other end connected by a universal joint to an arm 78 secured on the vertical shaft 65. Thus as the partial rotation of the shaft 65 causes the support 64 to swing through its 90° arc (clockwise as viewed in FIG. 6), the support 63 will also be moved towards the left, and as the support 64 returns to its normal position, the support 63 will also move back to its normal position.

When the boards for a layer on the lumber stack are moved from the skids 36, by the operation of the layer feed chains 38 (FIG. 1A), as previously described, the boards for the layer are moved out onto the support 63 and 64 (FIG. 6), these supports being in their normal positions and the top faces of these supports being in the same horizontal plane. Then the operation of motor 69 swings the support 64 clockwise and simultaneously causes the support 63 to move to the left, with the result that the layer of boards drops down on the lumber stack. As the support 63 returns to its normal position it contacts the ends of the boards in this dropped layer and insures that the contacted ends of the boards will be even with each other.

A switch-actuating arm 80 (FIGS. 1A, 2 and 5) is pivotally mounted at one end in the upper frame of the stacking assembly and so arranged as to be engaged and pushed slightly upwardly by a layer of boards when the layer is moved onto the removable rest supports 63 and 64 from the skids 36. Then when the layer of boards is dropped onto the stack the switch arm 80 drops to its normal position. The arm 80 is connected to a multiple switch assembly 81 by a link 81′ (FIGS. 1A and 5), mounted on a cross member in the upper frame assembly. Briefly, the upward movement of the switch arm 80 causes the motor 69 to operate to move the movable rest supports 63 and 64 (FIG. 6) to cause the layer of boards to drop down onto the stack, and at the same time this upward movement of the arm 80 interrupts the circuit for the motor 44 (FIG. 5), so as to prevent any operation of the motor 44 while the arm 80 is in raised position and thus prevent the possibility of another layer of boards being moved from the skids 36 onto the movable rest supports 63 and 64 before the previous layer has been dropped onto the stack and before the arm 80 has dropped to normal position.

Referring again to the diagram in FIG. 8, the upward movement of the switch arm 80 operating the multiple switch assembly 81, disconnects the contacts 54 and thus, as long as the switch arm 80 is raised, prevents current passing through the line 55 and thus prevents operation of the motor 44, temporarily preventing any more boards being moved from the skids 36 onto the movable rest supports 63 and 64. The upward movement of the switch arm 80 connects the contacts 82 and causes current to pass from the main line 48 through line 84, switch 85 (to be described later) closed contacts 86′, line 86, closed contacts 82, line 87, closed limit switch 72 with the closed contacts 88, and line 89 to motor 69, which is connected to main conductor 47 by the line 69′. This operates the motor 69 moving the movable rest supports 63 and 64 and causing the layer of boards on these rest supports to be dropped onto the stack. The engagement of the switch element 70 (FIG. 6) with the limit switch 72 then temporarily opens this switch against the force of its spring and, by disconnecting the contacts 88, stops the operation of the motor 69 in that direction. The opening of this limit switch 72 also disconnects the contacts 52 and prevents current from passing through the line 53 to the motor 44 until the motor 69 operates in the reverse direction (so as to move the rest supports 63 and 64 back into their normal positions) and thereby permits limit switch 72 to close. As apparent, the purpose of opening the contacts 52 is to prevent any more boards being moved off the skids 36 until the movable rest supports 63 and 64 return to normal position. The dropping of the layer of boards onto the stack causes switch arm 80 to drop. This closes the contacts 83 causing current from main conductor 48 to pass through line 90, closed contacts 83, line 91, contacts 92, temporarily held closed by the spring-actuated limit switch 73, and line 93 to motor 69. This causes motor 69 to operate in the reverse direction so as to move the movable rest supports 63 and 64 back to normal position until element 71 (FIG. 6) engages the limit switch 73 and stops the operation of the motor in this direction by opening the contacts 92.

The lift is moved down and up by the operation of a reversible lift motor 94 which is automatically controlled by switches diagrammatically indicated in FIG. 8. Assuming that the lift is in maximum raised position for receiving the layer of boards for the stack, the discharging of the layer of boards from the skids 36 onto the movable rest supports 63 and 64 and the raising of the arm 80 of the multiple switch assembly 81, closing the contacts 82, will start the motor 69 to move the rest supports to open position, as previously described, and also release limit switch 73, closing the contacts 98. The raising of the upper arm 80 also closes the contacts 95 and consequently current will now momentarily pass from main conductor 48, through line 96, closed contacts 95, line 97, closed contacts 98, and line 99 to motor 94, which is connected to main conductor 97 by the line 94′, causing the motor 94 to move the lift downwardly until the lowering of the arm 80 (caused by the dropping of the layer of boards onto the lift), opening the contacts 95, stops the operation of motor 94 and the momentary downward travel of the lift. Limit switch 73 delays the downward travel of the lift until the movable rest supports have started to move to open or discharging position. This intermittent operation of the motor 94 and the intermittent downward travel of the lift is repeated as each layer of boards is deposited on the lift until the stack of boards has reached predetermined desired size and the lift has been lowered until the load of boards on the lift has come into engagement with switch 100 and moves that switch so as to close the contact 101. Switch 100 is actuated by a spring-controlled contact element (not shown) which is so positioned as to be engaged by the load on the lift but not by the lift itself. Thereupon current passes from main conductor 48 through line 103, switch 100, contact 101, line 104, normally closed bottom limit switch 105, and line 106 to motor 94. This causes further operation of motor 94 in the same direction and causes the lift to move downward further depositing the lift load on the lumber transfer truck 61 (FIG. 1A). When the lift reaches the bottom of the lift frame it engages the lower limit switch 105 and the opening of this bottom limit switch prevents any further downward travel of the lift. When the load is removed from the lift while the lift is in its lowest position the actuating element for the switch 100 is released and its spring causes the closing of contact 102.

A spring-loaded switch 109 (FIG. 8) is engaged by the lumber transfer truck 61 and held open whenever the truck is in loading position in the bottom of the lift frame. When the load has been deposited on the transfer truck and the truck has been moved away from the lift frame the switch 109 closes and engages the contact 108 while the contact 101 is also closed by the removal of the load. The switch 85 is an upper limit, spring-actuated switch in the lift frame which is arranged for engagement both by the lift and by any load on the lift. When the lift is in raised position for loading, this switch closes the contacts 111. Therefore, when the switch 109 is closed by the moving out of the transfer truck, current passes from main conductor 48 through line 103, switch 100, contact 102, line 107, contact 108, switch 109, line 110, closed contacts 111 and line 112 to motor 94. This causes motor 94 to be operated in the opposite direction and the lift accordingly is raised in the lift frame until the upper limit switch 85 is engaged, which opens the contacts 111 and prevents any further operation of the motor 94, in that direction.

The limit switch 85 is so positioned and arranged as to be engaged by the lift when the lift is in raised position for receiving the first layer of boards for the stack and to be engaged by each layer of boards as each layer is deposited on the lift. Thus the limit switch 85 remains engaged until the loading of the lift is completed and the lift is lowered for discharging the stack. As long as the switch 85 is engaged the contacts 111 are open while the contacts 86′ are closed. When the lift is lowered, or is not in proper position for receiving a layer of boards, the contacts 86′ will be open. This prevents any inadvertent operation of the motor 69 to move the movable rest supports 63 and 64 and thus prevents any boards being dropped from the rest supports 63 and 64 when the lift is not in proper raised position to receive them.

At each station the layer feed chains 38 (FIGS. 1A and 5) with their sprockets 39 and 40, their motor 44, and the mounting for the switch-actuating arm 80 and switch assembly 81, are all supported on an upper frame structure 125 which in turn rests upon the main frame of the lift but which may be adjusted to a limited extent up and down with respect to the main lift frame and thus with respect to the skids 36, which are secured to the main frame, and also with respect to the movable rest supports 63 and 64. The reason for enabling this upper frame structure 125 to be raised or lowered is to enable the stacking assembly to handle boards of greater or less thickness. Thus when boards of greater thickness are to be handled by the device the upper frame structure 125 is raised slightly so as to accommodate layers of the thicker boards.

The upper integral frame structure 125 includes a pair of transversely-extending channel members 115 which are joined at their ends by a pair of end bars 114 (see also FIG. 2). The channel members 115 move up or down on the stationary upright members 113 which extend up from the base of the lift frame. A pair of transversely-extending rotatable shafts 116 and 117 (FIGS. 2, 5 and 7) carry adjustable wedges 119 which are slidably supported in brackets 118 secured on the stationary upright members. Cooperating wedges 120 are secured to the underside of the channel members 115, one of these being shown in FIG. 7, and these wedges 120 rest on the adjustable wedges 119. The adjustable wedges 119 have threaded channels through which the shafts 116 or 117 extend and the diameter of the shafts is enlarged at these places and the surface of the shaft is threaded to correspond with the threads in the channels of the wedges 119. Thus, as apparent from FIG. 7, rotation of the shafts 116 and 117 will move the adjustable wedges 119 and the movement of the latter, through their bearing engagement with the wedges 120 secured on the frame structure of 125 will cause the latter to be raised or lowered depending upon the direction of rotation of the shafts 116 and 117. Sprockets 122 and 123 (FIGS. 1A and 2) are secured on the ends of the shafts 116 and 117 respectively and are connected by the endless chain 121. A crank handle 124 is secured to shaft 117 and the adjustment of the position of the upper frame structure 125 is obtained by manual turning of the crank handle 124. Obviously other simple means might also be used for adjusting the upper frame structure 125.

It would be possible to make various minor modifications in the construction and arrangement of different parts of the device without departing from the principle of the invention, and it is not intended to limit the invention except to the extent set forth in the claims.

I claim:

1. An automatic lumber sorter and stacker including a series of stations to which boards of predetermined decreasing length are to be delivered successively, a pair of endless main conveyor chains driven in unison in a horizontal path, a support frame for said conveyor chains, said conveyor chains moving over said successive board delivery and stacking stations, board-supporting hooks spaced equal distances apart pivotally mounted on said conveyor chains in transverse registration respectively and extending downwardly from the bottom courses of said conveyor chains respectively, guide means for lining up one end of each board as each board is placed on a pair of said hooks leaving the other end of the board extending at random, each hook having a board-supporting arm extending oppositely from the direction of travel of said conveyor chains, latch means for each hook capable of holding the hook in board-carrying position when suspended from its conveyor chain, but enabling said hook to swing downwardly to board-discharging position when said latch means is released, a latch-releasing assembly located ahead of each delivery and stacking station for releasing the hooks carrying a board when the assembly is actuated, actuating means in each releasing assembly arranged for engagement by said other random length end of the board when the board has a length equal to that desired for a particular station, said latch-releasing assemblies and said stations so arranged that decreasingly shorter boards will be discharged at successive stations, a lift assembly in each station, a pair of skids located below each latch-releasing assembly and said main conveyor chains leading forwardly and downwardly to the top of the lift assembly, whereby a board discharged from its hooks by a latch-releasing assembly will drop onto the skids for delivery to the corresponding lift assembly, layer feed means restraining the delivery of boards from the skids to the corresponding lift assembly so as to cause a desired layer of boards to be delivered to said lift assembly with each operation of said layer feed means, electrically-operated means for operating said layer feed means, a pair of movable rest-supports at the top of each lift assembly for receiving each layer of boards delivered from the skids, electrically-controlled rest-support operating means for moving said rest-supports into and out of discharging position, a lift and lift motor in each lift assembly, controls for said lift motor, a multiple switch assembly connected to each lift motor and to the rest-support operating means at each station for synchronizing the movement of the rest-supports to discharging position and the downward movement of the lift, and an actuating element for the multiple switch assembly operated by the delivery of a layer of boards onto the rest-supports.

2. The combination set forth in claim 1 with the addition of adjustable supporting means mounted on each lift assembly for the layer feed means and multiple switch actuating element, whereby to accommodate the layer feed means and multiple switch assembly to board layers of different thickness.

3. In a lumber sorter of the character described, a pair of endless conveyor chains driven in unison at uniform speed, a support frame for said conveyor chains, board-supporting hooks spaced equal distances apart mounted on said conveyor chains in transverse registration respectively and extending downwardly from the bottom courses of said conveyor chains, whereby pieces of lumber placed on said pairs of hooks will be carried along the bottom courses of said conveyor chains until discharged from said hooks, each hook having a board-supporting arm extending oppositely from the direction of travel of said conveyor chains, a pair of endless feeder chains leading to said conveyor chains, said feeder chains having board-engaging elements in transverse alignment spaced equal distances apart, said feeder chains driven oppositely from said conveyor chains so as to carry pieces of lumber along their top courses to the bottom courses of said conveyor chains, the spacing between said board-engaging elements on said feeder chains being greater than the spacing between said board-supporting hooks of said conveyor chains, means for driving said conveyor chains, and related means for driving said feeder chains, the speed of said feeder chains being greater than the speed of said conveyor chains and so regulated that each pair of said board-engaging elements on said feeder chains will catch up with a pair of board-supporting hooks on said conveyor chains before said feeder chains reach the termination of their top courses.

4. In a lumber sorter and stacker of the character described having a station to which boards of predetermined length are to be delivered, a pair of endless main conveyor chains driven in unison in a horizontal path, a support frame for said conveyor chains, said conveyor chains moving over the delivery station, board-supporting hooks spaced equal distances apart hingedly mounted on said conveyor chains in transverse registration respectively and extending downwardly from the bottom course of said conveyor chains, guide means for lining up one end of each board as each board is placed on a pair of said hooks and leaving the other end of the board extending at random, each hook having a board-supporting arm substantially horizontal when the hook is held in board-carrying position, latch means for each hook capable of holding the hook in board-carrying position when suspended from its conveyor chain but enabling said hook to swing downwardly to board-discharging position when said latch means is released, an electrically-operated latch-releasing assembly located ahead of the board delivery station for releasing the latches of the hooks carrying a board for said station when said assembly is actuated, a pair of switches in the actuating circuit for said assembly, each of said switches having an engageable element extending down into the path of said other random end of the board and positioned in transverse alignment at one side of the path of said chains, one of said elements located further out from the path of said chains than the other and so positioned as to be engaged only by the random ends of boards of longer length than desired for the station, the switch operated by said first mentioned element being normally closed and opened only upon engagement of said first mentioned element by the random end of a passing board, the other switch element being positioned a slight distance in from said first mentioned element and the switch operated by said other element being normally open, whereby the circuit to said latch-releasing assembly will be closed only when the board approaching said station is of such length that said random end of the board will engage said other switch element without engaging said first mentioned switch element.

5. In a lumber sorter and stacker having a delivery station to which boards of a predetermined length are to be delivered, a pair of endless main conveyor chains driven in unison in a horizontal path, said conveyor chains moving over the delivery station, board-carrying hooks mounted on said conveyor chains in transverse alignment respectively and extending downwardly from the bottom courses of said conveyor chains, means located ahead of said delivery station for discharging a board of desired predetermined length from a pair of said hooks on said conveyor chains, a pair of skids located below said means leading to said delivery station, a lift assembly in said delivery station, a lift in said assembly, layer feed chains controlling the delivery of boards from said skids to said lift assembly, electrically-operated means for operating said layer feed chains, a pair of movable rest-supports in the top of said lift assembly for receiving the boards delivered from said skids by said layer feed chains and in turn discharging the boards onto said lift when said movable rest-supports are moved to discharging position, electrically-controlled rest-support operating means for moving said rest-supports into and out of discharging position, and automatic switch control means connected with said layer feed chain operating means and with said rest-support operating means preventing the operation of said layer feed chain operating means when said rest-supports are in discharging position.

6. The combination set forth in claim 5 with the addition of an operating motor for said lift, a multiple control switch assembly connected with said lift motor and with said rest-support operating means for synchronizing the movement of said rest-supports to discharging position and the downward movement of said lift, and an actuating element for said multiple control switch assembly automatically operated by the movement of a layer of boards onto said rest-supports.

7. The combination set forth in claim 5 with the addition of an operating motor for said lift, a multiple control switch assembly connected with said lift motor and with said rest-support operating means for synchronizing the movement of said rest-supports to discharging position and the downward movement of said lift, an actuating element for said multiple control switch assembly automatically operated by the movement of a layer of boards onto said rest-supports, and an automatic safety control in said multiple control switch assembly preventing the movement of said rest-supports to discharging position when said lift is not in proper layer receiving position.

References Cited in the file of this patent

UNITED STATES PATENTS

| 1,706,632 | Onstad | Mar. 26, 1929 |
| 2,013,141 | Frost | Sept. 3, 1935 |
| 2,769,558 | Ehlers | Nov. 6, 1956 |
| 2,816,643 | Klamp | Dec. 17, 1957 |
| 2,902,150 | Rambo | Sept. 1, 1959 |
| 2,947,405 | Fenton | Aug. 2, 1960 |

UNITED STATES PATENT OFFICE
CERTIFICATE OF CORRECTION

Patent No. 3,006,468　　　　　　　Dated October 31, 1961

Inventor(s) William M. Blake

It is certified that error appears in the above-identified patent and that said Letters Patent are hereby corrected as shown below:

Column 1, lines 4 and 5, "assignor to Moore Oregon Lumber Co., a corporation of Nevada" should read -- assignor of one-half percent to Moore Oregon Lumber Co., (Moore, Oregon) doing business as Style of Cap Arago Lumber Co., Empire, Oreg., a corporation of Nevada --.

Signed and sealed this 3rd day of April 1973.

(SEAL)
Attest:

EDWARD M. FLETCHER, JR.　　　　　　　ROBERT GOTTSCHALK
Attesting Officer　　　　　　　　　　　Commissioner of Patents